March 17, 1970     TING LI CHU     3,501,356

PROCESS FOR THE EPITAXIAL GROWTH OF SILICON CARBIDE

Filed May 12, 1966

WITNESSES:

INVENTOR
Ting Li Chu

BY
ATTORNEY

United States Patent Office 3,501,356
Patented Mar. 17, 1970

3,501,356
PROCESS FOR THE EPITAXIAL GROWTH OF SILICON CARBIDE
Ting Li Chu, Pittsburgh, Pa., assignor to Westinghouse Electric Corporation, Pittsburgh, Pa., a corporation of Pennsylvania
Filed May 12, 1966, Ser. No. 549,648
Int. Cl. C23c 11/00, 13/00
U.S. Cl. 148—175      8 Claims

ABSTRACT OF THE DISCLOSURE

Silicon carbide is epitaxially grown on a suitable substrate by a pyrolytic chemical reaction occurring between a reactant gas mixture consisting of a mixture of two compounds, one compound being selected from the group consisting of halogenated aliphatic hydrocarbons, halogenated aromatic hydrocarbons, and hydrides of carbon, and one compound being selected from the group consisting of halides of silicon and hydrides of silicon in at least one gas selected from the group consisting of hydrogen, helium, and argon. A silicon carbide substrate surface may be etched in situ by hydrogen gas prior to the epitaxial growth process.

---

This invention relates to the vapor growth of epitaxial silicon carbide crystals by the pyrolysis of suitable reactant gas mixtures.

Heretofore, the epitaxial growth of silicon carbide on suitable substrates has been carried out in a vertical reaction tube furnace. The substrates were maintained at a temperature of from 1700° C. to 1750° C. and were supported on a tantalum carbide coated tantalum cylinder which was in turn supported on a graphite rod.

The reactant gas mixture consisted of 0.1 mole percent each of silicon tetrachloride and carbon tetrachloride in hydrogen gas flowing at a rate of 1 liter per minute.

The grown epitaxial films exhibited high concentrations of imperfections in addition to those imperfections normally carried over from the substrates themselves.

The reaction between graphite and hydrogen increases appreciably at temperatures above 1000° C. The heating of tantalum carbide in a hydrogen atmosphere at 1650° C. produces carbon which deposits rapidly on the wall of the reaction tube. Therefore, one readily sees that the sources of the contamination of the epitaxial growth films are conceivably an improperly designed reaction chamber and poor growth conditions.

An object of this invention is to provide a process for growing an epitaxial film of silicon carbide on a suitable substrate, the epitaxial film being substantially free of imperfections derived from a source other than the substrate.

Another object of this invention is to provide a process for growing on a suitable substrate an epitaxial film of silicon carbide substantially free of imperfections derived from a source other than the substrate and having a desired resistivity.

Another object of this invention is to provide a suitable silicide coated material to make containers, heaters and the like for the growth of silicon carbide crystals from a vapor phase by physical or chemical means.

A further object of this invention is to provide a process for depositing a suitable silicide coating on a component for a vapor growth apparatus employed to grow silicon carbide and other crystals from a vapor phase by physical or chemical means.

A still further object is to provide a means for in situ chemical etching of bodies of silicon carbide material.

Other objects of the invention will, in part, be obvious and will, in part, appear hereinafter.

Figure 1:
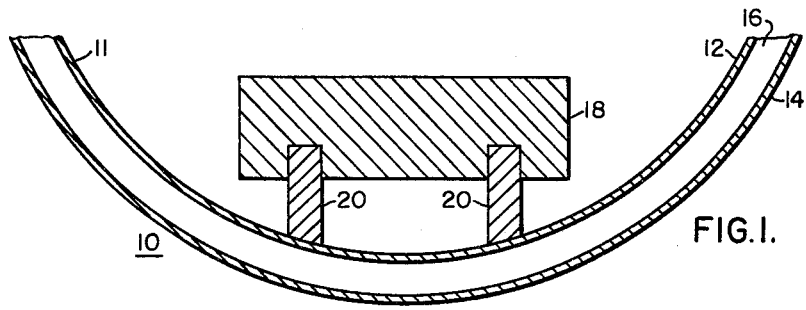
Figure 2:
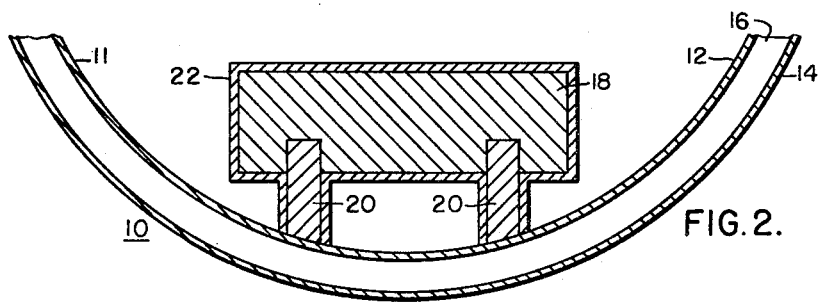
Figure 3:
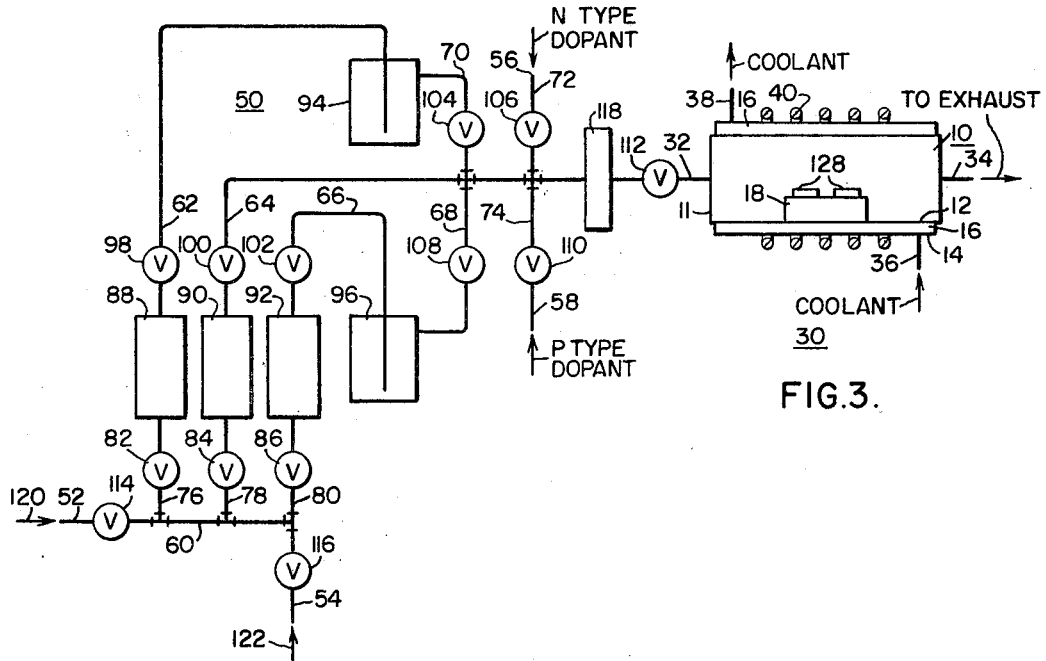

For a better understanding of the nature and objects of the invention, reference should be had to the following detailed description and drawings in which:

FIGURES 1 and 2 are views in cross-section of a portion of a vapor growth apparatus embodying the teachings of this invention; and FIG. 3 is a schematic view of a vapor growth system embodying the teachings of this invention.

In accordance with the teachings of this invention and in the attainment of the foregoing objects, there is provided a process for growing a layer of silicon carbide upon a suitable substrate comprising the steps of heating a surface of the substrate on which the silicon carbide is to be grown to a brightness temperature of at least 1650° C. and passing a reactant gas mixture over the heated surface of the substrate whereby the reactant gas mixture undergoes a pyrolytic chemical reaction thereby depositing silicon carbide on the heated surface of the substrate, the reactant gas mixture consisting of a mixture of two compounds, one compound being selected from the group consisting of halogenated aliphatic hydrocarbons, halogenated aromatic hydrocarbons, and hydrides of carbon, and one compound selected from the group consisting of hydrides of silicon, and halides of silicon, in a gas selected from the group consisting of hydrogen, helium, argon, a mixture of hydrogen and argon and a mixture of hydrogen and helium, the reactant gas mixture having a gas flow rate equivalent to 2 liters per minute in a reaction tube having a one inch inside diameter and the linear velocity of the reactant gas is equivalent to at least 8 centimeters per second in a reaction tube having a one inch inside diameter.

The process taught by this invention is suitable for vertical reaction chambers as well as horizontal reaction chambers. However, to more particularly describe the teachings of this invention, and for no other purpose, the process, embodying the teachings of this invention, will be described as employing a horizontal reaction chamber.

With reference to FIG. 1 there is shown a portion of a liquid cooled horizontal reactor chamber 10 suitable for growing epitaxial films of silicon carbide on suitable substrates. The chamber 10 comprises a reaction tube 11 comprising an inner wall 12, an outer wall 14 and a passage 16 for the circulation of a coolant about the inner wall 12 of the tube 11 and a heater 18.

The heater 18 also acts as a susceptor and has integral legs 20 and is disposed within the tube 11. The legs 20 support the heater 18 and prevent the heater 18 from contacting the inner wall 12 of the tube 10.

To grow silicon carbide films by the vapor deposition method at an elevated brightness temperature of 1650° C. and above, it is essential that the heater 18 be inert toward silicon carbide, hydrogen, carbon and silicon compounds. A material suitable for use in making the heater 18 and the legs 20 is one selected from the group consisting of tantalum, molybdenum and tungsten and upon which is disposed a layer of silicide of the material comprising the heater 18. The legs 20, however, may be made of silicon carbide.

The formation of the silicide layer on the surface of the heater 18 may be accomplished in the same horizontal reactor chamber used for growing epitaxial films of silicon carbide. Additionally, the layer of silicide may, although not required, be applied as a process step in making the first initial run of growing epitaxial fibers of silicon carbide on suitable substrates.

Referring to FIG. 2 there is shown the heater 18 and the integral legs after a layer 22 of a silicide of the material comprising the heater 18 has been formed on the heater 18. The layer 22 was formed by depositing silicon carbide very slowly on the surfaces of the heater 18 and the legs 20 at a temperature of at least 1800° C.

With reference to FIG. 3, there is shown a schematic of a suitable vapor growth system 30 utilizing the portion of the liquid cooled horizontal reactor chamber 10 shown in FIG. 2.

The system 30 comprises the chamber 10 having as gas inlet tube 32 and a gas outlet tube 34 attached to the reactor tube 11.

The coolant, such, for example, as water, enters the passage 16 through a coolant inlet tube 36 and exits from the passage 16 through a coolant outlet tube 38.

The heater 18 is inductively heated by a radio frequency coil 40 which encompasses the chamber 10.

The dimensions of the reaction tube 11 are determined by the dimensions of the heater 18. In order to more fully explain the invention, and for no other reason, the heater 18 will be described as being ¾ of an inch in width and ¼ of an inch in thickness. The reaction tube 11 need only be 1 inch in inside diameter to achieve satisfactory results. The legs 20 are accordingly made long enough to support the heater 18 clear of the inside surfaces of the tube 11.

To introduce and control the flow and purity of the materials necessary for the proper operation of the liquid cooled horizontal reaction chamber 10, a material handling system 50 is provided.

The material handling system 50 comprises inlet tubes 52, 54, 56 and 58, connecting conduits 60, 62, 64, 66, 68, 70, 72, 74, 76, 78 and 80, metering valves 82, 84 and 86, flowmeters 88, 90 and 92, containers 94 and 96, shut-off valves 98, 100, 102, 104, 106, 108, 110, 112, 114 and 116, and a filter 118. The filter 118 may be made of a suitable material such, for example, as polyethylene and is also capable of removing solid particles larger than 0.3 micron from the reactant gas mixture stream.

To more particularly describe the invention, and for no other reason, the vapor growth apparatus 10 will be described as utilizing a heater 18 made of tantalum and having legs made of silicon carbide.

Tantalum, molybdenum, tungsten, and their silicides are susceptible to embrittlement in the presence of hydrogen during the heating-up and the cooling-off periods of the chamber 10. Therefore, the heater 18 should be exposed to hydrogen only at high temperatures at which the solubility of hydrogen in these aforementioned materials is negligible.

The employment of an argon atmosphere eliminates the embrittlement of tantalum and tantalum silicide components during the heating-up and cooling-off periods.

At the start all shut-off valves and metering valves are closed.

After the tantalum heater 18 has been disposed in the reaction tube 11, the reaction tube 11 is flushed with argon gas. Argon gas is released from an argon gas source 122 and flows into the inlet tube 54. The shut-off valve 116, the metering valve 84 and the shut-off valves 100 and 112 are each opened in a progressing sequence to allow the argon gas to pass first through the connecting conduits 60 and 78, next through the flowmeter 90, thence through the connecting conduit 64, through the filter 118, thence through the inlet tube 32, next through the reaction tube 11 and out the exhaust tube 34. The rate, and time, of the argon gas flow need only be sufficient enough to assure a complete flushing of all the air from the reaction tube 11.

Water is caused to flow in through the coolant inlet tube 36, through the passage 16 and out the coolant exit tube 38.

When it has been assumed that all the air has been flushed out of the reaction tube 11, the radio frequency coil 40 is energized and the heater 18 is gradually raised to a temperature of at least approximately 1800° C.

When a temperature of at least approximately 1800° C. is reached, the shut-off valve 114 is opened and hydrogen gas is introduced into the reaction tube 11. The hydrogen gas enters the system 50 through the inlet tube 52 from the hydrogen gas source 120, thence flowing through the connecting conduit 60 and thence following the same flow route as the argon gas.

The shut-off valve 116 is closed and the atmosphere within the tube 11 is now a hydrogen atmosphere.

The metering valve 86 and the shut-off valves 102 and 108 are then opened to permit a portion of the hydrogen gas to be diverted and caused to flow through the connecting conduit 80, next through the flow meter 92, then through the connecting conduit 66 into the container 96 holding a quantity of a suitable silicon halide, such for example, as silicon tetrachloride. The silicon tetrachloride is then transported by the hydrogen through the connecting conduit 68 to rejoin the undiverted hydrogen gas in the interconnecting conduit 64. The undiverted hydrogen gas and the hydrogen gas transporting the silicon tetrachloride then flow together through the filter 118 and thence through the reaction tube 11.

In the reaction tube 11, silicon produced by the pyrolytic reaction of the hydrogen gas with the silicon tetrachloride is deposited on the tantalum heater 18. At the temperature of at least approximately 1800° C., the silicon when deposited on the heater 18 immediately reacts with the tantalum to form the layer 22 (FIG. 2) of tantalum silicide. The surface film may consist of tantalum silicide having any or all of the chemical compositions $TaSi_2$, $Ta_5Si_3$, $Ta_2Si$, and $Ta_5Si$. A layer 22 of at least 20 microns in thickness is desirable to assure one that the tantalum silicide coated tantalum heater 18 is chemically inert to silicon carbide and hydrogen gas at high temperatures.

To achieve the desired thickness, as well as to assume the integrity of the layer 22 of tantalum silicide, it is preferred that the silicon be slowly deposited on the surfaces of the tantalum heater 18. The silicon should preferably be deposited at a rate not exceeding 1 micron per minute. Additionally, the flow of the gas mixture must be sufficient to maintain a uniform flux of the reactant gas mixture over all the surfaces of the heater 18.

It has been found that a reactant gas mixture having a total hydrogen gas flow of 2½ liters per minute and containing ½ mole percent of silicon tetrachloride is adequate for forming the layer 22 of tantalum silicide having the desired minimum thickness over the entire heater 18, including the support legs 20, in a flow time of twenty minutes.

Upon achieving the desired thickness of the layer 22, the metering valve 86 and the shut-off valves 102 and 108 are closed. The shut-off valve 116 is then opened and then the shut-off valve 114 is closed. An argon atmosphere now replaces the previous hydrogen atmosphere and the radio frequency coil 40 is deenergized to allow the vapor growth apparatus 10 to cool to room temperature.

Other suitable silicon bearing compounds which are employed to supply the silicon for the formation of the layer 22 of tantalum silicide are trichlorosilane, silicon tetrabromide and silicon tetraiodide. The mole percent for each compound is the same as the mole percentage of silicon tetrachloride employed heretofore.

When the apparatus 10 has cooled to room temperature, the flow of argon gas was stopped and prepared substrates 128 of suitable semiconductor materials were disposed on the tantalum silicide coated tantalum heater 18.

The substrates 128 were prepared by mechanical polishing followed by an ultrasonically cleaning process in hydrofluoric acid, water and then ethanol before being dried.

Each substrate 128 comprises a body of a semiconductor material selected from the group consisting of silicon carbide and compounds of Group III and Group V elements.

To obtain the best growth film of epitaxial silicon carbide, that is the epitaxial film having the least imperfections contained therein which carried over the substrate it is grown on, the crystalline structure of each substrate 128 should be the same as the crystalline structure of the silicon carbide epitaxially grown therein. For epitaxially growing cubic phase silicon carbide, each substrate 128 should have a cubic crystalline structure. For epitaxially growing hexagonal phase silicon carbide, each substrate 128 should have a hexagonal crystalline structure.

A second prerequisite of the crystalline structure for each of the substrates 128 is that the dimension between the adjacent corners of the unit cell, the lattice constant or lattice parameter, should be the same as or very similar to the dimension between the adjacent corners of the unit cell of the epitaxially grown silicon carbide.

The perfection of the epitaxially grown silicon carbide has also been found to be dependent upon the temperature of the surface of the substrate upon which the silicon carbide is to be epitaxially grown. To grow epitaxial silicon carbide of the cubic phase, a substrate surface brightness temperature of from 1400° C. to approximately 1700° C. is required. To grow epitaxial silicon carbide of the hexagonal phase, a substrate surface brightness temperature of from 1700° C. to 1800° C. is required.

Brightness temperatures are measured with a microoptical pyrometer. These temperatures are about 100° C. lower than the true temperature. The difference between the measured and the true temperatures occurs because of the emissivity correction of the substrate's surface, the emissivity correction of the epitaxially grown silicon carbide and the reflection loss at the wall of the reaction tube 11.

To more particularly described the invention and for no other purpose, the invention will be described as employing substrates 128 comprising bodies of silicon carbide semiconductor material having a hexagonal crystalline structure. Hexagonal phase epitaxial silicon carbide will be grown on this type of substrate.

Employing previously described operating procedures, the reaction tube 11 was first flushed with argon to purge the tube 11 of air. Argon gas continued flowing as the radio frequency coil 40 was energized to raise the substrates 128 to a brightness temperature of at least approximately 1650° C.

The substrates 128 are then etched in situ by a suitable chemical etching reagent such, for example, as chlorine-oxygen gaseous mixtures or hydrogen gas. Hydrogen is preferred since the chlorine-oxygen gaseous mixtures produce cobblestone like surfaces on the substrates 128.

The shut-off valve 114 was opened and hydrogen was introduced into the reaction tube 11. The hydrogen gas flow was increased while the argon gas flow was decreased. Then shut-off valve 116 was closed and only hydrogen gas was passing through the reaction tube 11.

For the size of the reaction tube 11 it has been found that a flow-rate of 2.5 liters of hydrogen gas per minute will etch the surfaces of the substrates 128 at a rate of 55 microns per hour at a brightness temperature of 1650° C. If the brightness temperature of the substrates surfaces is raised to 1700° C., the etching rate increases to 125 microns per hour. Most often only 10 microns need to be removed from the surface of the substrates 128 upon which epitaxial growth of silicon carbide is desired.

The hydrogen gas chemical etch process is non-preferential and the etched surfaces which result are clean and microscopically smooth. The in situ hydrogen gas chemical etching of substrates is therefore a very convenient process step when growing epitaxial layers of silicon carbide on suitable substrates.

When in situ chemical etching of the substrates 128 has been completed, a reactant gas mixture is introduced into the reaction tube 11 and caused to flow about the surface of each substrate 128 upon which the epitaxial growth of silicon carbide is to be achieved. To assure the best possible deposits of epitaxial grown silicon carbide, that is, a uniform growth occurring across one substrate area and also a uniformity of growth among all substrates in a run, a good uniform flux of the reactant gas mixture over the deposition surface of the substrates 128 is essential.

To achieve this good uniform flux, a high linear velocity for the reactant gas mixture is necessary. The linear velocity of the reactant gas mixture is preferably at least 8 centimeters per second when measured at room temperature. A velocity of 12 centimeters per second or greater is preferred since a good uniform flux will always be obtained.

Employing the heater 18 and the reaction tube 11 of the dimensions previously stated, the flow rate of the reactant gas mixture should be at least 2 liters per minute.

Employing the vapor growth apparatus 10 and its associated material handling system 50, the epitaxial growth of silicon carbide is achieved by the thermal reduction of such suitable mixtures as carbon and silicon halides with hydrogen on the heated surfaces of the substrates 128. The chemical equation of the reaction is as follows:

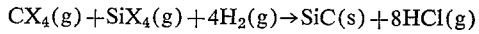
$$CX_4(g) + SiX_4(g) + 4H_2(g) \rightarrow SiC(s) + 8HCl(g)$$

Where X is either chlorine, bromine or iodine.

Other suitable reactant gas mixtures consist of mixtures of other halogenated aliphatic hydrocarbons or halogenated aromatic hydrocarbons and halides of silicon and hydrogen. Suitable halogenated aliphatic hydrocarbons are chloroform, ethyl chloride, ethyl bromide, propyl chloride, propyl bromide and the like. Suitable halogenated aromatic hydrocarbons are monochlorobenzene, dichlorobenzene, dibromobenzene, monobromobenzene, chlorotoluene, bromotoluene and the like.

The mixtures of silicon hydrides and hydrocarbons in an inert gas flow system are also suitable reactant gas mixtures for growing epitaxial films of silicon carbide. A suitable silicon hydride is silane. Methane, ethane, acetylene and the like are suitable hydrocarbons. An inert gas such, for example, as helium, argon and a mixture of helium and argon may be used in these reactant gas mixtures.

In order to more fully describe the invention, and for no other reason, the reactant gas mixture will be described as consisting of a mixture of carbon tetrachloride, silicon tetrachloride and hydrogen.

The perfection of the epitaxially grown silicon carbide is also dependent on the growth rate. The growth rate is important to crystal perfection since epitaxially grown material deteriorates at high growth rates.

At a given flow rate, the concentrations of silicon tetrachloride and carbon tetrachloride in the reactant gas mixture can be adjusted to yield the desired growth rate. This is important because the composition of the reactant gas mixture is confined to a narrow range.

As the silicon carbide is being epitaxially grown, it is simultaneously being etched by the hydrogen gas of the reactant gas mixture. The observed growth rate of the epitaxial material is therefore the net result of the deposition of silicon carbide by the thermal reduction of the reactant gas mixture and the etching of the deposit of silicon carbide by the hydrogen gas.

At a flow rate of 2.5 liters per minute of hydrogen at a brightness temperature of 1700° C., if the concentrations of both silicon tetrachloride and carbon tetrachloride are each only of the order of 0.055 mole percent, the epitaxial growth of silicon carbide on the substrate occurs but the net result of the growth process is the chemical etching of the substrates. When the concentration of both the silicon tetrachloride and the carbon tetrachloride exceeds 0.055 mole percent, the rate of epitaxial growth of silicon carbide exceeds the chemical etching rate of the hydrogen and a net growth of epitaxial silicon carbide is achieved. If the concentration of the silicon tetrachloride and carbon tetrachloride are each greater than the order of 0.08 mole percent, the deposition rate of silicon carbide on the substrates 128 is too great to yield epitaxial films of good crystal perfection.

Metering valves 82 and 86 and shut-off valves 98 100, 102, 104 and 108 are opened.

The metering valve 82 is adjusted to allow enough hydrogen gas to flow through connecting conduits 76 and 62 and thence through the container 94 of carbon tetrachloride to provide a concentration range of greater than 0.055 mole percent but not greater than 0.08 mole percent of carbon tetrachloride in the reactant gas mixture.

In a similar manner, metering valve 86 is adjusted to allow a concentration range of greater than 0.055 mole percent but not greater than 0.08 mole percent of silicon tetrachloride in the reactant gas mixture.

Metering valve 84 is adjusted to provide a total hydrogen gas flow of 2.5 liters per minute.

Under these conditions, at a brightness surface temperature of 1700° C. for the substrates 128, the range of observed growth rate of epitaxial silicon carbide on the substrates 128 is from 20 to 50 microns per hour.

The brightness temperature of the surface of the substrates 128 may be as high as 1800° C. The growth rate of epitaxial silicon carbide increases accordingly. The preferred brightness temperature range, however, is from 1700° C. to 1715° C.

The resulting epitaxially grown silicon carbide is of good uniform quality throughout and is of good crystal perfection.

During the epitaxial growth of silicon carbide, a suitable dopant can be introduced into the reactant gas mixture in order to obtain any desired resistivity for the epitaxial silicon carbide being grown.

Suitable dopants for controlling the conductivity type of, and the carrier concentrations in, the grown silicon carbide are diborane, nitrogen, arsine and phosphine.

The introduction of dopants into a reaction gas mixture under conditions yielding epitaxial silicon carbide layers of good perfection increases the growth rate more than 50 percent. However, the quality of the grown silicon carbide is degraded.

To achieve suitably doped epitaxial silicon carbide, the reactant gas mixture to be employed in the reaction tube 11 of the given dimensions should consist of hydrogen gas flowing at 2.5 liters per minute and containing equal parts of silicon tetrachloride and carbon tetrachloride, each being present in a range of concentrations of from 0.035 mole percent to 0.045 mole percent and no greater than 0.2 mole percent of a doping material. The growth rate of the doped epitaxial silicon carbide ranges therefore from 0.3 micron per minute to 0.6 micron per minute.

A preferred reactant gas mixture for producing suitably doped epitaxial silicon carbide is hydrogen gas flowing at 2.5 liters per minute and containing 0.04 mole percent of silicon tetrachloride and 0.04 mole percent of carbon tetrachloride. The resulting growth rate is 0.5 micron per minute of doped epitaxial silicon carbide.

The following examples are illustrative of the teachings of this invention:

EXAMPLE I

A hexagonal platelet of silicon carbide substrate having a wurtzite structure, 0.25" across and 0.015" thick was prepared for the epitaxial growth of silicon carbide on one of its major surfaces. The major surface was successively lapped with boron carbide and polished with a diamond paste. The substrate was then cleaned ultrasonically in hydrofluoric acid, water and alcohol. The substrate was then dried.

The substrate was then placed on a tantalum silicide coated tantalum heater in a reaction tube one inch in inside diameter. The reaction tube was part of a water cooled horizontal vapor growth apparatus.

Argon gas was caused to flow through the reaction tube to purge all the air from the tube. The heater, and therefore the substrate, was externally heated by a RF generator to a brightness temperature of $$1700° C. \begin{matrix}+15° C.\\-0° C.\end{matrix}$$

as water was caused to flow through the coolant passage of the apparatus.

The brightness temperature was measured by a micro-optical pyrometer. The brightness temperature was about 100° C. lower than the true temperature because of the emissivity correction of silicon carbide and the reflection loss at the wall of the reaction tube.

Hydrogen gas, flowing at a rate of 2.5 liters per minute replaced the argon gas flow. The hydrogen flow was maintained for approximately five minutes to chemically etch approximately 10 microns of silicon carbide from the prepared surface of the substrate.

At the end of approximately 5 minutes a reactant gas mixture was caused to flow over the etched surface of the substrate. The reactant mixture consisted of 0.055 mole percent of carbon tetrachloride and 0.055 mole percent of silicon tetrachloride in hydrogen gas having a gas flow rate of 2.5 liters per minute. The flow of the reactant gas mixture was continued for one hour.

The velocity of the reactant gas at room temperature was 12 centimeters per second. At the end of the one hour run, the flow of the reactant gas mixture was replaced by argon. The substrate was cooled to room temperature in an argon atmosphere.

The substrate was removed from the vapor growth apparatus and examined under an optical microscope.

No epitaxial growth of silicon carbide could be found on the surface of the substrate. However, a dimensional check of thickness of the substrate confirmed that the net result of the epitaxial growth run was only further chemical etching of the substrate's surface.

EXAMPLE II

The same procedure of Example I was followed with a newly prepared silicon carbide substrate except that the concentrations of the silicon tetrachloride and the carbon tetrachloride in the reactant gas mixture was changed.

The concentration of carbon tetrachloride was 0.060 mole percent and the concentration of silicon tetrachloride was 0.060 mole percent.

Upon removal of the substrate from the vapor growth apparatus, visual examination revealed that a growth of silicon carbide had occurred on the surface of the substrate. Optical microscopic examination and chemical etching revealed that the grown silicon carbide was epitaxial in that the grown silicon carbide had the same structural perfection as the substrate.

The epitaxial silicon carbide grown was 24 microns in thickness. The average growth rate of the epitaxial silicon carbide was 0.4 micron per minute.

EXAMPLE III

The same procedure of Example I was followed with a newly prepared silicon carbide substrate except that the concentrations of the silicon tetrachloride and the carbon tetrachloride in the reactant gas mixture was changed.

The concentration of the silicon tetrachloride was 0.075 mole percent and the concentration of the carbon tetrachloride was 0.075 mole percent.

After the vapor growth process had been completed, the substrate was removed and examined. Visual examination revealed that a growth of silicon carbide had occurred on the surface of the substrate.

Optical microscopic examination and chemical etching of the silicon carbide growth revealed that the growth was epitaxial. The epitaxial silicon carbide also had the same crystal perfection as the substrate.

The epitaxial growth of silicon carbide was 42 microns. The growth rate was 0.7 micron per minute.

EXAMPLE IV

The same procedure of Example I was followed with a newly prepared silicon carbide substrate except that the concentrations of the silicon tetrachloride and the carbon tetrachloride in the reactant gas mixture was changed.

The concentration of the silicon tetrachloride was 0.090 mole percent and the concentration of the carbon tetrachloride was 0.090 mole percent.

After the vapor growth process had been completed, the substrate was removed and examined. Visual examination revealed that a growth of silicon carbide had occurred on the surface of the substrate.

Optical microscopic examination and chemical etching of the silicon carbide growth revealed that the growth was polycrystalline in structure.

No measurement of the thickness of the growth was recorded since the material was not suitable for electrical device fabrication.

EXAMPLE V

The same procedure of Example I was followed with a newly prepared silicon carbide substrate except that the composition of the reactant gas mixture was changed.

The substrate was of p-type semiconductivity and had a resistivity of 0.01 ohm-centimeter.

The reactant gas mixture consisted of hydrogen gas having a gas flow rate of 2.5 liters per minute. The hydrogen was contained 0.04 mole percent of silicon tetrachloride and 0.04 percent of carbon tetrachloride. Phosphine was introduced into the reactant gas mixture during the entire vapor growth time at a flow rate of $2.2 \times 10^{-6}$ moles per minute.

After the vapor growth process had been completed, the substrate was removed and examined. Visual examination revealed that a growth of silicon carbide had occurred on the surface of the substrate.

Optical microscopic examination and chemical etching of the silicon carbide growth revealed that the growth was epitaxial and that the epitaxial silicon carbide had a similar structural perfection as the substrate.

The epitaxial growth of silicon carbide measured 30 microns in thickness. The growth rate of the epitaxial silicon carbide was 0.5 micron per minute.

The electrical resistivity of the epitaxially grown silicon carbide was evaluated. It was found to be 0.02 ohm-centimeter. The epitaxial silicon carbide was of n-type semiconductivity.

A gold-tantalum electrical contact was alloyed to the n-type region of semiconductivity. A gold-tantalum-aluminum electrical contact was alloyed to the p-type region of semiconductivity. The substrate with the epitaxially grown silicon carbide was connected into a simple electrical circuit to operate as a semiconductor diode. The diode was found to have a reverse voltage capability of higher than 50 volts at 500° C.

In a hydrogen transport process where silicon carbide is a source material, appropriate components of the apparatus used in the process can utilize the teachings of this invention. To reduce contamination of the grown silicon carbide crystals, containers, such, for example, as crucibles, and heaters, including susceptors, comprise a base material selected from the group consisting of tungsten, tantalum, and molybdenum with a coating of silicide of the base material disposed on surfaces in contact with the hydrogen.

While this invention has been shown only in one form, it will be obvious to those skilled in the art that modifications, substitutions and the like may be made therein without departing from its scope.

I claim as my invention:

1. A process for growing a layer of silicon carbide upon a suitable substrate comprising the steps of (1) heating a surface of the substrate on which silicon carbide is to be grown to a brightness temperature of at least 1650° C. and (2) passing a reactant gas mixture over the heated surface of the substrate whereby the reactant gas mixture undergoes a pyrolytic chemical reaction thereby depositing silicon carbide on the heated surface of the substrate, the reactant gas mixture consisting of a mixture of two compounds, one compound being selected from the group consisting of halogenated aliphatic hydrocarbons, halogenated aromatic hydrocarbons and hydrides of carbon, and one compound being selected from the group consisting of halides of silicon and hydrides of silicon in at least one gas selected from the group consisting of hydrogen, helium, and argon, the reactant gas mixture having a gas flow rate equivalent to 2 liters per minute required in a reaction tube having a one inch inside diameter and the linear velocity of the reactant gas mixture is equivalent to at least 8 centimeters per second required for a reactant gas mixture in a reaction tube having a one inch inside diameter.

2. The process of claim 1 in which the surface of the substrate is heated to a brightness temperature in the range of from 1700° C. to 1800° C. and the crystalline structure of the silicon carbide epitaxially disposed on the heated surface of the substrate is of the hexagonal phase.

3. The process of claim 1 in which the substrate has a hexagonal crystalline structure, the surface of the substrate is heated to a brightness temperature range of from 1700° C. to 1730° C. and the silicon carbide is epitaxially disposed on the heated surface of the substrate and has a hexagonal crystalline structure.

4. The process of claim 1 in which the substrate has a hexagonal crystalline structure, the surface of the substrate is heated to a brightness temperature range of from 1700° C. to 1730° C., the reactant gas mixture consists of mixtures of carbon halides and silicon halides in hydrogen gas and the silicon carbide is epitaxially disposed on the heated surface of the substrate and has a hexagonal crystalline structure.

5. The process of claim 1 in which the substrate has a hexagonal crystalline structure, the surface of the substrate is heated to a brightness temperature range of from 1700° C. to 1715° C., the reactant gas mixture consists of mixtures of equal parts of carbon halides and silicon halides in hydrogen gas having an equivalent gas flow rate of 2.5 liters per minute and the reactant gas mixture has an equivalent linear velocity of at least 12 centimeters per second, the range of concentration of the carbon halides and the silicon halides being each greater than 0.055 mole percent but less than 0.090 mole percent, and the silicon carbide is epitaxially disposed on the heated surface of the substrate and has a hexagonal crystalline structure.

6. The process of claim 1 in which the reactant gas mixture also includes one of the materials selected from the group consisting of phosphine, diborane, nitrogen and arsine.

7. The process of claim 1 in which the substrate is silicon carbide having a hexagonal crystalline structure, the surface of the substrate is heated to a brightness temperature range of from 1700° C. to 1715° C., the reactant gas mixture consists of carbon halides, silicon halides and phosphine in hydrogen gas having an equivalent gas flow rate of 2.5 liters per minute and the reactant gas mixture has an equivalent linear velocity of 12 centimeters per second, the range of concentration of the carbon halides is from 0.03 mole percent to 0.05 mole percent, the range of concentration of the silicon halides is from 0.03 mole percent to 0.05 mole percent and the range of concentration of the phosphine is no greater than 0.003 mole percent, and the silicon carbide is epitaxially deposited on the heated surface of the substrate and has a hexagonal crystalline structure and is on n-type semiconductivity.

8. The process of claim 1 including disposing the substrate on a heater, said substrate being of silicon carbide semiconductor material, the heater comprising a material selected from the group consisting of tantalum, tungsten and molybdenum, said heater having a layer of a silicide of the material comprising the heater disposed on the surface of the heater, and etching in situ the surface of the substrate upon which the silicon carbide is to be grown by hydrogen gas prior to the passing of the reactant gas mixture over the etched surface of the substrate.

References Cited

UNITED STATES PATENTS

| | | | |
|---|---|---|---|
| 2,993,814 | 7/1961 | Epprecht et al. | 117—201 |
| 3,099,534 | 7/1963 | Schweickert et al. | 23—208 |
| 3,157,541 | 11/1964 | Heywang et al. | 148—174 |
| 3,228,756 | 1/1966 | Hergenrother | 23—208 XR |
| 3,243,323 | 3/1966 | Corrigan et al. | 156—17 XR |
| 3,382,113 | 5/1968 | Ebert et al. | 148—175 |
| 3,386,866 | 6/1968 | Ebert et al. | 148—175 |

L. DEWAYNE RUTLEDGE, Primary Examiner

R. A. LESTER, Assistant Examiner

U.S. Cl. X.R.

117—106, 201